Feb. 4, 1947. M. PIPKIN Re. 22,838

FLASH LAMP AND METHOD OF MANUFACTURE THEREOF

Original Filed Dec. 31, 1941

Inventor:
Marvin Pipkin,
by John H. Anderson
His Attorney.

Reissued Feb. 4, 1947 Re. 22,838

UNITED STATES PATENT OFFICE 22,838

FLASH LAMP AND METHOD OF MANUFACTURE THEREOF

Marvin Pipkin, Cleveland Heights, Ohio, assignor to General Electric Company, a corporation of New York Original No. 2,383,076, dated August 21, 1945, Serial No. 425,014, December 31, 1941. Application for reissue April 6, 1946, Serial No. 660,052

6 Claims. (Cl. 18—59)

My invention relates in general to flash lamps or similar devices comprising a sealed enclosure, and to a method of manufacturing the same. More particularly, my invention relates to the construction of the enclosure for such flash lamps and similar devices.

In flash lamps in general use at present, the enclosing bulb for the light-producing charge is usually made of glass or other vitreous material. Obviously, with such flash lamps there is always the danger of flying fragments of broken glass when the lamp, for some unexpected reason, explodes on charge flashing.

One object of my invention is to provide a flash lamp having a bulb made of a material such that the bulb will not break and shatter, so as to scatter flying fragments of the bulb, in the event an explosion should occur upon flashing of the lamp.

Another object of my invention is to provide a method of manufacturing such a substantially nonbreakable and nonshatterable flash lamp.

Still another object of my invention is to provide a flash lamp having a bulb made of a relatively inexpensive material of such a nature that broken fragments thereof will not possess any sharp cutting surfaces such as are apt to produce bodily injury.

A feature of my invention is the use of a bulb made of a suitable plastic material and sealed to the glass stem of the lamp mount structure.

Figure 1:
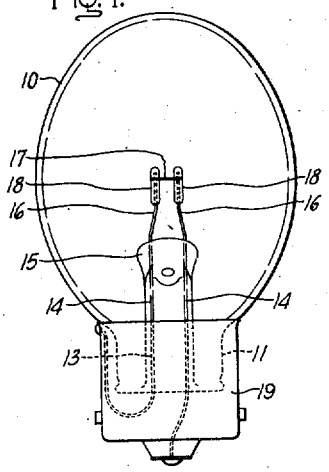
Figure 2:
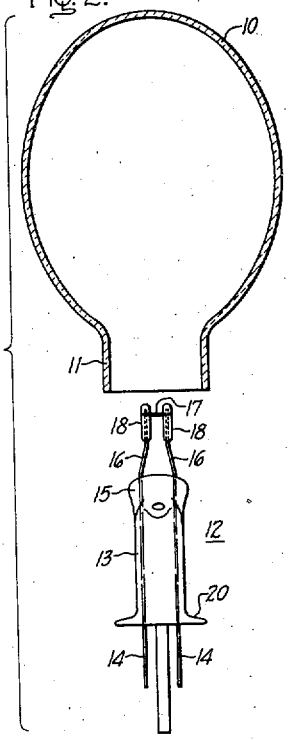
Figure 3:
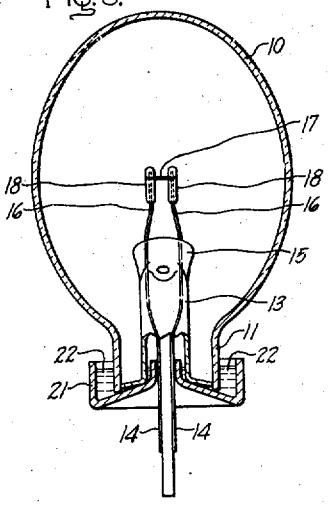
Figure 4:
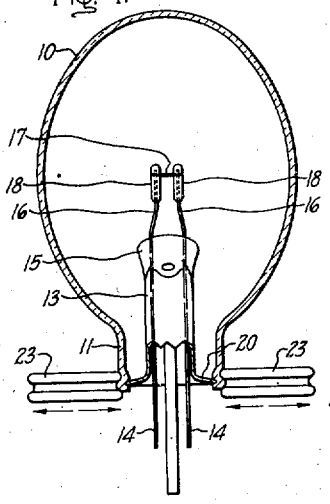
Figure 5:
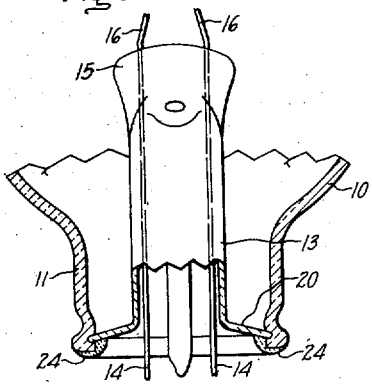
Figure 6:
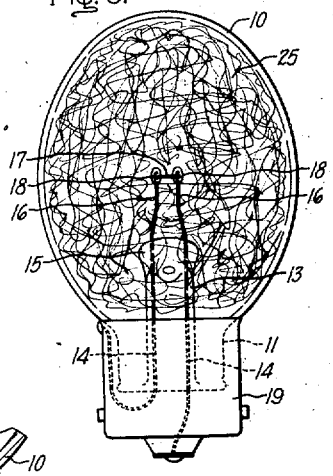
Figure 7:
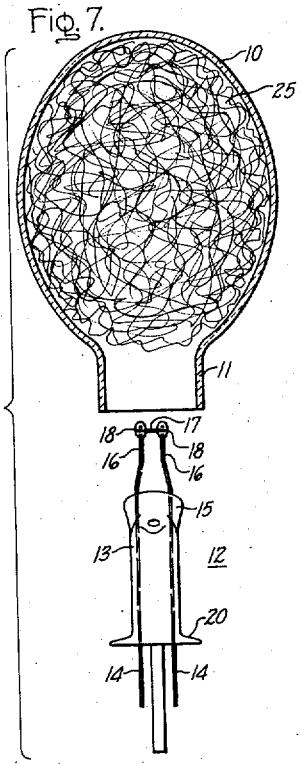

Further objects and advantages of my invention will appear from the following description of species thereof and from the accompanying drawing in which:

Fig. 1 is an elevation of a flash lamp comprising my invention; Figs. 2, 3 and 4 are views illustrating the steps involved in manufacturing the flash lamp shown in Fig. 1; Fig. 5 is a fragmentary sectional view, on an enlarged scale, showing the completed seal between the bulb and stem of the lamp shown in Figs. 1–4; Fig. 6 is an elevation of a modified form of flash lamp comprising my invention; and Fig. 7 is a view illustrating one of the steps involved in manufacturing the modified form of flash lamp shown in Fig. 6.

In the drawing, Figs. 1–4 illustrate the invention as applied to a flash lamp of the type disclosed and claimed in my copending application Serial No. 328,399, filed April 8, 1940, now Patent No. 2,291,983, in which the source of actinic radiation is constituted by one or more beads or compact masses of an agglutinated flashlight powder admixture disposed within the lamp bulb and comprising a combustible metallic powder such as zirconium or magnesium or mixtures thereof, and a supporter of combustion consisting of oxygen-evolving powder such as calcium peroxide, potassium perchlorate, etc.

Referring to Figs. 1–4, the flash lamp there shown comprises a bulb or envelope 10 of a suitable plastic material capable of transmitting radiations produced within the bulb by the light-generating means disposed therein and hereinafter described. The plastic material employed for the bulb may be any of the well-known plastic materials, such as cellulose acetate, which possess the property of becoming soft either when immersed in a suitable solvent or when heated; i. e., thermoplastic. The bulb 10, if desired, may be coated on its outside and/or inside surface (preferably the inside) with a suitable lacquer or similar material.

The bulb 10 is formed with a neck 11 to which the glass stem 13 of a lamp mount structure 12 is sealed. The mount structure 12 comprises, in addition to the stem 13, a pair of leading-in wires 14, 14 sealed into the press portion 15 of the glass stem and provided with juxtapositioned inner lead portions 16, 16. Extending between the inner lead portions 16, 16 and electrically connected thereto is an ignition filament 17 of a suitable refractory metal, such as tungsten. Disposed on the tip of each inner lead 16 is a small compact mass or bead 18 of a suitable combustible material or fulminating substance which, upon ignition, produces a momentary flash of actinic light. At their outer ends, the leading-in wires 14, 14 are connected to the terminals of a suitable base 19 cemented or otherwise suitably secured to the neck 11 of the lamp bulb.

In the manufacture of the flash lamp shown in Fig. 1, the bulb 10 and mount structure 12 are first formed separately, as shown in Fig. 2, and then attached and sealed together to form the complete bulb assembly. The attachment and sealing of the glass stem 13 to the bulb neck 11 is effected, according to the invention, by first softening the neck of the bulb so that it becomes pliable and somewhat tacky, and then rolling or pressing the softened wall of the bulb neck around the periphery of a flange 20 formed on the stem 13 at the outer end thereof.

Referring to Fig. 3, showing one manner of sealing the bulb and the mount structure together, the flanged end of the stem 13 and the neck end of the bulb are placed in a suitably shaped cup or container 21 in proper assembled interrelation, with the bulb neck surrounding the flange 20. The container 21 is filled with a suitable solvent 22 capable of softening the plastic material of which the bulb 10 is made. Where cellulose acetate is used as the material for the bulb 10, the solvent 22 may consist of, for instance, acetone. As the bulb neck gradually softens and acquires a tacky condition, it tends to shrink down onto and adhere to the rim or peripheral edge of the flange 20 on the stem. The so attached bulb and mount structure are then removed from the container 21 and the bulb neck, while still in a soft and pliable state, pressed against and molded around the rim or peripheral edge of the stem flange 20 by means of one or more suitable shaping tools or rollers 23 (Fig. 4) to thereby adhesively attach and seal the bulb neck to the stem flange. To better insure a hermetic seal, and also to strengthen the same, it may be desirable to apply a coating 24 of a suitable lacquer or similar material around the seal, as shown in Fig. 5.

After the mount 12 has been sealed into the bulb, the base 19 is cemented or otherwise secured to the bulb neck and the leading-in wires 14, 14 suitably connected to the terminals of the base, as by soldering, thus completing the flash lamp.

Instead of placing both the bulb 10 and the mount structure 12 in assembled relation in the solvent 22, the bulb alone may be immersed in the solvent and after the neck becomes soft, the bulb removed from the solvent, the mount 12 inserted in place within the bulb, and the bulb neck, while still soft and pliable, then pressed into engagement with the rim or peripheral edge of the stem flange 20, as before. With this method, however, it is necessary that the bulb neck be made of such an internal diameter that, after the softening and shrinkage of the bulb neck, the internal diameter thereof will still be sufficient to permit entry of the stem flange 20 thereinto.

Where the plastic material used for the bulb 10 possesses the property of becoming soft upon the application of heat thereto, then the softening of the bulb neck 11 may be effected instead by heating the same in a suitable manner, as by conduction from a heating element in contact with the bulb neck. After the bulb neck has been thus softened, the lamp mount structure 12 is inserted in place within the bulb and the stem 13 attached and sealed to the softened neck by pressing the latter down onto the peripheral edge of the stem flange 20, as before.

Figs. 6–7 illustrate the invention as applied to a flash lamp of the type in which a quantity of readily ignitable metal, in the form of a thin foil or in filamentary form, is loosely disposed throughout the lamp bulb. Except for the presence of the loosely distributed combustible material 25, the lamp shown in Figs. 6 and 7 otherwise is substantially the same as that shown in Fig. 1. The combustible material 25 preferably consists of aluminum or magnesium, or alloys thereof, in filamentary form.

The manufacture of the lamp shown in Fig. 6 is substantially the same as that disclosed hereinabove in connection with Figs. 1 and 5, the only difference being that the bulb 10 is first filled with the combustible material 25, as shown in Fig. 7, before the mount structure 12 is sealed thereinto. After the bulb 10 has been so filled with the combustible material 25, the mount structure 12 is then sealed into the bulb by any of the methods disclosed hereinabove in connection with Figs. 1 to 4.

What I claim as new and desire to secure by Letters Patent of the United States is:

1. In the manufacture of a lamp comprising a bulb of organic plastic material and a mount structure comprising a flanged stem tube having an exhaust tube depending therefrom, the steps which comprise assembling the mount and bulb with the stem tube telescoped in the bulb neck and with the lower end of the bulb neck and the adjoining stem flange located in an annular trough-shaped container containing a solvent for the material of the bulb and with the exhaust tube extending through the central opening in the annular trough, whereby the bulb neck is softened by the solvent and shrunk around the stem flange, removing the assembly from the trough, and then pressing the softened neck portion into firm engagement with the stem flange.

2. A flash lamp of the type comprising a bulb having a compact body of agglutinated material supported therein and comprising a combustible and a supporter of combustion intimately associated with each other, and electrical means at least a portion of which is in contact with said body for developing an ignition temperature therein, said body constituting the sole source of radiation emitted by the lamp wherein the said bulb consists of light-transmitting organic plastic material.

3. A flash lamp of the type comprising a hollow bulb having supported therein agglutinated material comprising a combustible and a supporter of combustion which constitutes the light-giving material wherein the said bulb consists of light-transmitting organic plastic material.

4. A flash lamp of the type comprising a hollow bulb having supported therein a flash charge comprising finely divided combustible material in a concentrated mass carrying its own solid oxygen-evolving agent and constituting substantially the sole source of radiation emitted by the lamp, and ignition means for developing an ignition temperature in said flash charge, wherein the said bulb consists of light-transmitting organic plastic material.

5. A flash lamp of the type comprising a hollow bulb having a compact charge of agglutinated material supported therein and comprising a combustible and a supporter of combustion intimately associated with each other and electrical ignition means for developing an ignition temperature in said charge to cause it to be ignited to emit a flash light constituting substantially the sole source of radiation emitted by the lamp, wherein the said bulb consists of light-transmitting organic plastic material.

6. A flash lamp of the type comprising a hollow bulb having leading-in conductors extending thereinto, an ignition filament in said bulb bridging said conductors, and a compact charge of agglutinated material comprising a combustible and a supporter of combustion intimately associated with each other and coated on said conductors in position to be ignited upon heating of said filament to emit a flash of light constituting substantially the sole source of radiation emitted by the lamp, wherein the said bulb consists of light-transmitting organic plastic material.

MARVIN PIPKIN.

REFERENCES CITED

The following references are of record in the file of this patent:

UNITED STATES PATENTS

| Number | Name | Date |
|---|---|---|
| 2,272,059 | De Margitta | Feb. 3, 1942 |
| 2,333,725 | Kreidler | Nov. 9, 1943 |

FOREIGN PATENTS

| Number | Country | Date |
|---|---|---|
| 551,004 | Germany | May 25, 1932 |